United States Patent
Rajvanshi et al.

(10) Patent No.: US 11,657,988 B2
(45) Date of Patent: May 23, 2023

(54) SWITCHGEAR HAVING A MOUNTING BASE WITH AN INTERNAL ARC PATHWAY

(71) Applicant: SIEMENS INDUSTRY, INC., Alpharetta, GA (US)

(72) Inventors: Rahul Rajvanshi, Irving, TX (US); Thomas W. Hawkins, Arlington, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 4 days.

(21) Appl. No.: 17/497,410

(22) Filed: Oct. 8, 2021

(65) Prior Publication Data

US 2022/0028632 A1 Jan. 27, 2022

Related U.S. Application Data

(62) Division of application No. 16/815,783, filed on Mar. 11, 2020, now abandoned.

(51) Int. Cl.
| | |
|---|---|
| *H01H 9/02* | (2006.01) |
| *H01H 9/34* | (2006.01) |
| *H02B 1/30* | (2006.01) |
| *H02B 13/025* | (2006.01) |
| *H02B 13/065* | (2006.01) |

(52) U.S. Cl.
CPC ............. *H01H 9/342* (2013.01); *H01H 9/02* (2013.01); *H02B 1/303* (2013.01); *H02B 13/025* (2013.01); *H02B 13/065* (2013.01)

(58) Field of Classification Search
CPC .......... H01H 9/342; H01H 9/02; H02B 1/303; H02B 13/025; H02B 13/065
USPC ........................................................ 361/600
See application file for complete search history.

(56) References Cited

U.S. PATENT DOCUMENTS

| | | | | | |
|---|---|---|---|---|---|
| 2,824,939 | A | * | 2/1958 | Claybourn | H02B 1/56 218/51 |
| 5,193,049 | A | * | 3/1993 | Jackson | H02B 13/025 361/676 |
| 5,574,624 | A | * | 11/1996 | Rennie | H02B 1/56 361/676 |
| 5,689,097 | A | * | 11/1997 | Aufermann | H02B 13/025 361/676 |
| 6,215,654 | B1 | * | 4/2001 | Wilkie, II | H02B 1/202 361/828 |
| 6,417,443 | B1 | * | 7/2002 | Smith | H02B 1/565 361/676 |

(Continued)

*Primary Examiner* — Anatoly Vortman (57) ABSTRACT

A mounting base or a riser base for a switchgear is provided with side interior openings to provide an internal arc pathway through which arc gasses or plasma are safely discharged to an outside air. The mounting base includes a front wall having a first end and a second end, a rear wall having a first end and a second end, a first side channel connecting the first end of the front wall to the first end of the rear wall, a second side channel connecting the second end of the front wall to the second end of the rear wall, and forming the mounting base having a central open area in a first section of a switchgear that is adjacent a second section of the switchgear. The mounting base further includes at least one opening in the first side channel for the passage of an arc from the first section of the switchgear to the second section of the switchgear, and thereby forming the mounting base with the internal arc pathway.

20 Claims, 7 Drawing Sheets

(56) References Cited

U.S. PATENT DOCUMENTS

| | | | | |
|---|---|---|---|---|
| 7,054,143 B2* | 5/2006 | Eiselt | ................... | H02B 13/025 |
| | | | | 361/624 |
| 7,604,534 B2* | 10/2009 | Hill | ................... | H05K 7/20618 |
| | | | | 361/679.48 |
| 7,952,857 B1* | 5/2011 | Motley | ................ | H02B 13/025 |
| | | | | 361/678 |
| 9,516,784 B2* | 12/2016 | Pawar | ................ | H05K 7/20145 |
| 9,608,415 B2* | 3/2017 | Cardin | ................ | H02B 13/025 |
| 2004/0097186 A1* | 5/2004 | Eiselt | ....................... | H02B 1/56 |
| | | | | 454/184 |
| 2012/0013227 A1* | 1/2012 | Josten | ................ | H02B 13/025 |
| | | | | 312/109 |
| 2014/0118887 A1* | 5/2014 | Deb | .................... | H02B 13/025 |
| | | | | 361/622 |
| 2016/0043532 A1* | 2/2016 | Zende | ................ | H02B 13/025 |
| | | | | 361/611 |
| 2019/0148921 A1* | 5/2019 | Bellows | ................ | H02B 1/565 |
| | | | | 361/622 |

* cited by examiner

SWITCHGEAR HAVING A MOUNTING BASE WITH AN INTERNAL ARC PATHWAY

BACKGROUND

1. Field

Aspects of the present invention generally relate to a switchgear having a mounting base or a riser base with side interior openings for providing an arc pathway.

2. Description of the Related Art

Switchgear and switchboard are general terms which cover metal enclosures housing switching and interrupting devices such as fuses and circuit breakers along with associated control, instrumentation and metering devices. Switchgear and switchboard also house assemblies of these devices with associated buses, interconnections and supporting structures used for distribution of electric power.

There are High Voltage switchgear and switchboards, Medium Voltage switchgear and switchboards, and Low Voltage switchgear and switchboards. This invention is primarily geared towards the Low voltage switchgear and switchboards. Low voltage switchgear and switchboards operate at voltages up to 1058 volts and with continuous currents that can exceed 5000 amperes. They are designed to withstand short-circuit currents up to 200,000 amperes.

Typical switchgear is designed to withstand the effects of bolted (non-arcing) faults on the load terminals and this capability is validated during Short-Circuit Current and Short-Time Current Withstand Tests in IEEE Standard C37.20.1, the disclosure of which is incorporated herein by reference.

Customers have the need for Arc Resistant Switchgear that are front accessible (no rear access required for installation and/or operation and/or maintenance) and have high large breaker (Power Circuit Breaker) density. Applications often do not have area available for rear aisles and desire to have all accessibility from the front. Many features needed to be compressed into reduced spaces requiring innovative solutions.

The occurrence of an arcing fault inside the switchgear produces physical phenomena that are different from bolted faults. For example, the energy resulting from an internal arc in air causes a sudden pressure and temperature increase inside the enclosure. Materials involved in or exposed to the arc produce hot decomposition products, both gaseous and particulate, which may be discharged to the outside of the enclosure.

An internal arcing fault can be caused by insulation degradation, insulation, contamination, entrance of vermin, foreign objects coming into contact with the energized bus, or any other unplanned condition that creates an electrical discharge path through air. During an arcing fault, the voltage at the fault location is essentially the system voltage and the fault energy is focused within the switchgear enclosure. Arc temperatures can exceed 20,000 degrees Kelvin, rapidly heating the air and vaporizing metal parts. The expanding plasma creates severe mechanical and thermal stress in the equipment which can blow open doors and covers and burn through or fragment the enclosure and/or cause severe injury to an operator who may happen to be nearby.

Therefore, there is a need for a simplified design which enables a switchgear to safely discharge arc gases.

SUMMARY

Briefly described, aspects of the present invention relate to an arc resistant switchgear qualified to IEEE C37.20.7, the disclosure of which is incorporated herein by reference, so it is intended to provide an additional degree of protection to the personal performing normal operating duties in proximity to the energized equipment. Accessibility Type 1 arc resistant switchgear has features at the front of the equipment. Accessibility Type 2 Arc Resistant switchgear has features at the front, sides and rear of the equipment. Accessibility Type 2B provides Type 2 protection with control or instrumentation compartment doors open. This platform, 'Front Connected Switchgear' has the shallowest section depth in the industry. There is a need in arc resistant switchgear design to provide a means to direct the hot decomposition products created by an internal arcing fault away from the front, sides and rear of the equipment and away from personnel. There is a need to keep the section depth of the Front Connected Switchgear same in Arc Resistant construction. There is also a need in many switchgear installations to raise the equipment up off the floor by the use of a riser base or a housekeeping pad. The present invention combines the riser base and internal arc pathway. When installed under a compatible switchgear assembly, the riser base with internal arc pathway vents arc products and channel them away from front compartments of a switchgear to the adjacent sections by routing them under the switchgear. The gases then flow upwards through a rear compartment of the switchgear where they are safely discharged to an outside air. In this way, this is an inter-section design which helps adjacent sections safely discharge arc gases.

In accordance with one illustrative embodiment of the present invention, a mounting base for a switchgear is provided with an internal arc pathway. The mounting base comprises a front wall having a first end and a second end, a rear wall having a first end and a second end, a first side channel connecting the first end of the front wall to the first end of the rear wall, a second side channel connecting the second end of the front wall to the second end of the rear wall, and forming the mounting base having a central open area in a first section of a switchgear that is adjacent a second section of the switchgear. The mounting base comprises further comprises at least one opening in the first side channel for the passage of an arc from the first section of the switchgear to the second section of the switchgear, and thereby forming the mounting base with the internal arc pathway.

In accordance with one illustrative embodiment of the present invention, a switchgear is provided with an internal arc pathway. The switchgear comprises a first section and a second section adjacent to the first section. The switchgear further comprises a left end section riser base including a first side plate with no openings and a second side plate with a first opening. The switchgear further comprises a mid-section riser base including a first side plate with a second opening and a second side plate with a third opening. The switchgear further comprises a right end section riser base including a first side plate with a fourth opening and a second side plate with no openings. At least one opening of the first opening, the second opening, the third opening, the fourth opening provides the passage to an arc from the first section of the switchgear to the second section of the switchgear, and thereby forming the internal arc pathway.

DETAILED DESCRIPTION

To facilitate an understanding of embodiments, principles, and features of the present invention, they are explained hereinafter with reference to implementation in illustrative embodiments. In particular, they are described in the context of a switchgear having a mounting base or a riser base with side interior openings for providing an arc pathway. A front connected switchgear provides an additional degree of protection to any personnel who are performing normal operating duties in proximity to the energized equipment with an auxiliary compartment's doors open in the event of an internal arc fault. The mounting base or the riser base with side interior openings gives the switchgear an inter-section capability of successfully mitigating any arc products away from the front of the switchgear. The front connected switchgear section depth is minimized. Shallowest section depth in the industry is provided. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the switchgear having a mounting base or a riser base with side interior openings according to the present disclosure are described below with reference to FIGS. 1-8 herein. Like reference numerals used in the drawings identify similar or identical elements throughout the several views. The drawings are not necessarily drawn to scale.

Figure 1:
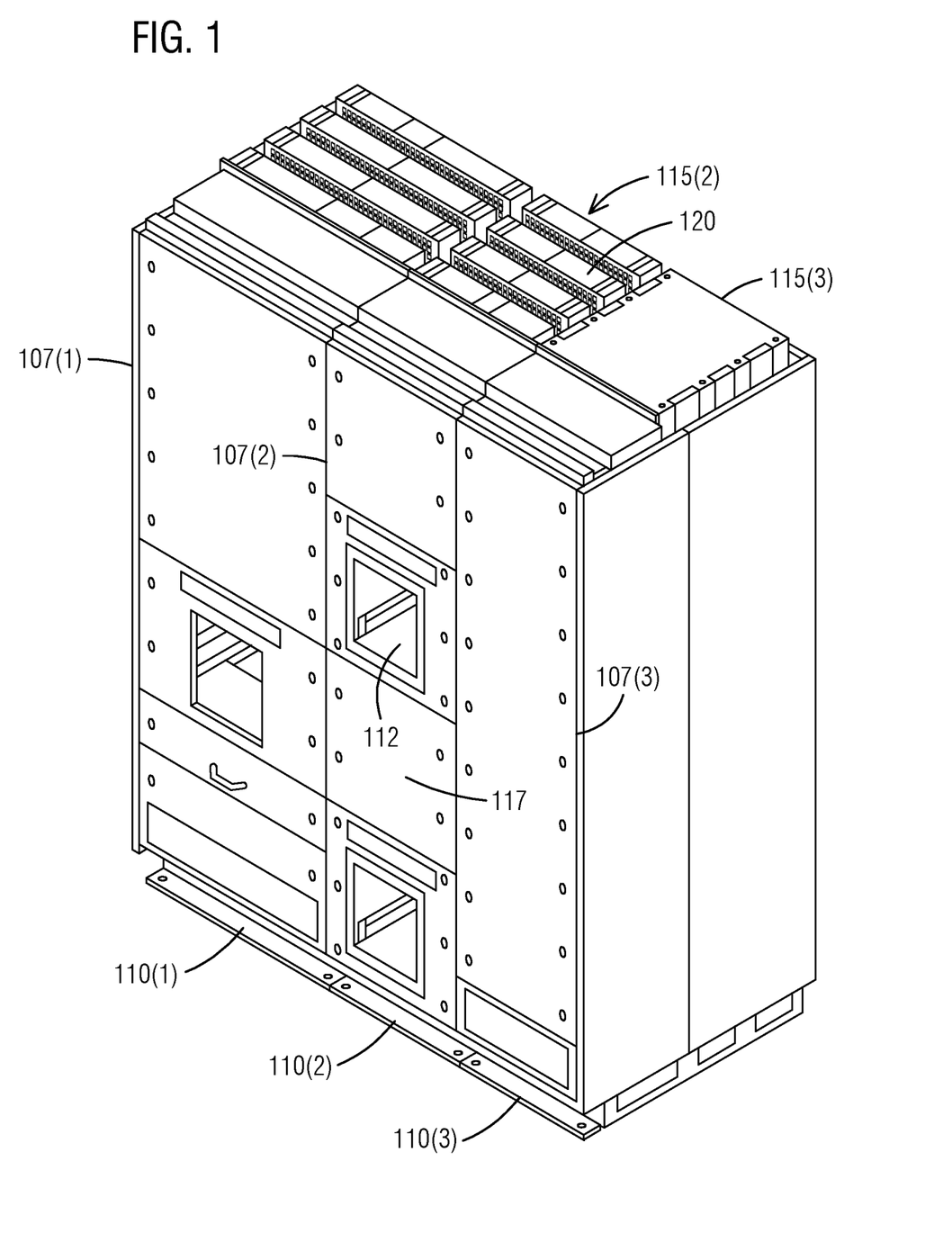
FIG. 1 illustrates a perspective view of a front connected switchgear assembly consisting of multiple switchgear sections including a main breaker section, a feeder circuit breaker section, and a cable section assembled on respective riser bases in accordance with an exemplary embodiment of the present invention.

Consistent with one embodiment of the present invention, FIG. 1 represents a perspective view of a front connected switchgear assembly 105 consisting of multiple switchgear sections including a main breaker section 107(1), a feeder circuit breaker section 107(2), and a cable section 107(3) assembled on respective riser bases 110(1-3) in accordance with an exemplary embodiment of the present invention. Each feeder circuit breaker section 107(2) can contain up to four circuit breaker compartments 112 containing one circuit breaker per compartment. Each section has a ventilation structure 115(1-3) located on top. Each feeder circuit breaker section 107(2) can also contain up to four instrumentation or control compartments 117. The feeder circuit breaker section 107(2) has a vent stack 120 with flaps. The cable section 107(3) is a load cable connection section.

Figure 2:
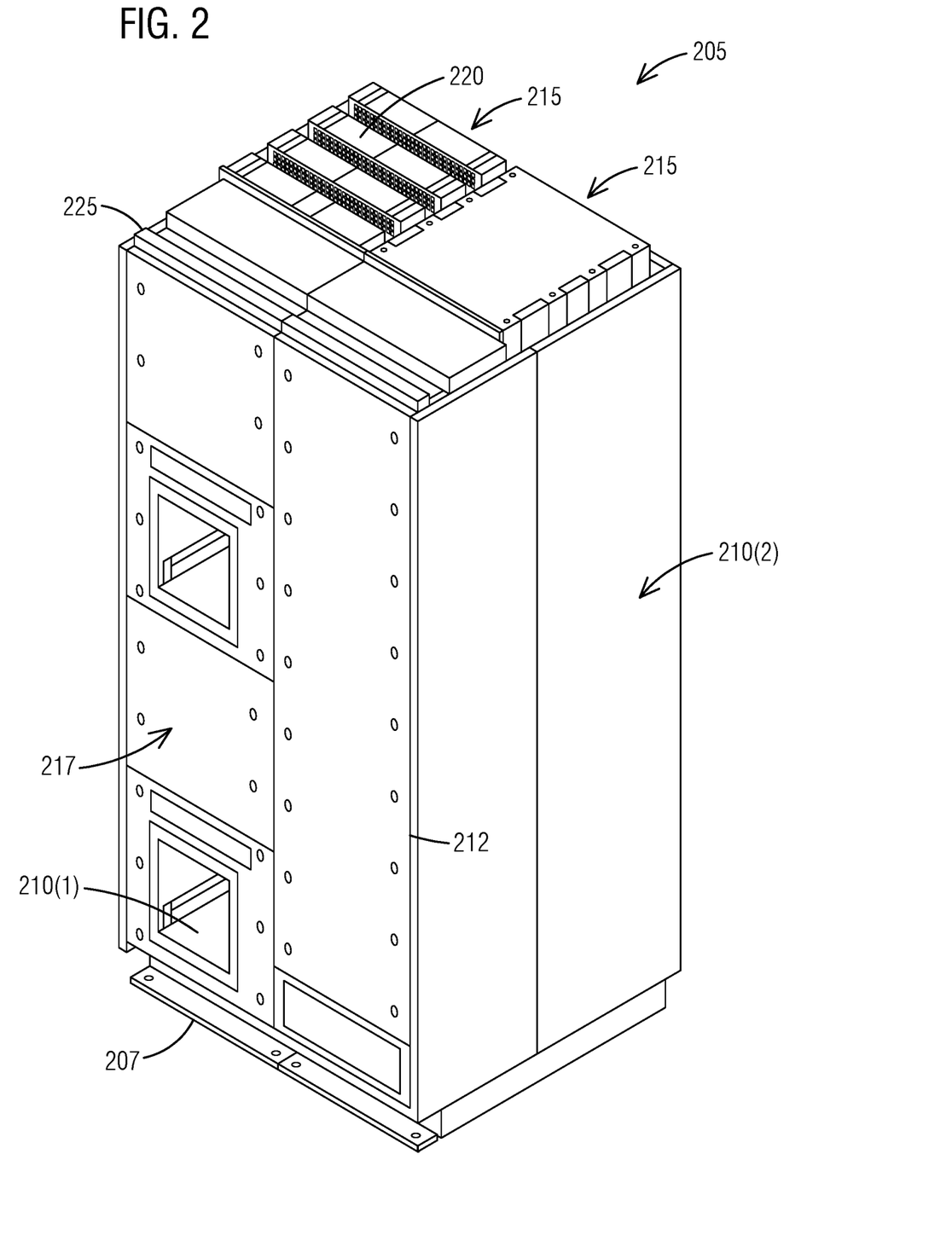
FIG. 2 illustrates a switchgear with an internal arc pathway in accordance with an exemplary embodiment of the present invention.

Referring to FIG. 2, it illustrates a switchgear 205 with an internal arc pathway (not seen) in accordance with an exemplary embodiment of the present invention. The switchgear 205 combines a mounting base or a riser base 207 and internal arc pathway. When installed under a compatible switchgear assembly, the riser base 207 with internal arc pathway vents arc products from a front compartment 210(1) of the switchgear 205 to an adjacent section 212 by routing them under the switchgear 205. The gases then flow upwards through a rear compartment 210(2) of the switchgear 205 where they are safely discharged to an outside air.

The switchgear 205 has at least one set of ventilation holes 215 to channel the passage of the arc. The switchgear 205 has at least one equipment compartment 217. The equipment compartment 217 accommodates at least one equipment selected from a group consisting of a circuit breaker, an electronic device, and an electronic module. The switchgear 205 has at least one vent stack 220 for the passage of an arc plasma. The vent stack 220 is located on an upper surface 225 of the switchgear 205. The vent stack 220 is secured to the switchgear 205 via at least one securing means (not seen).

Figure 3:
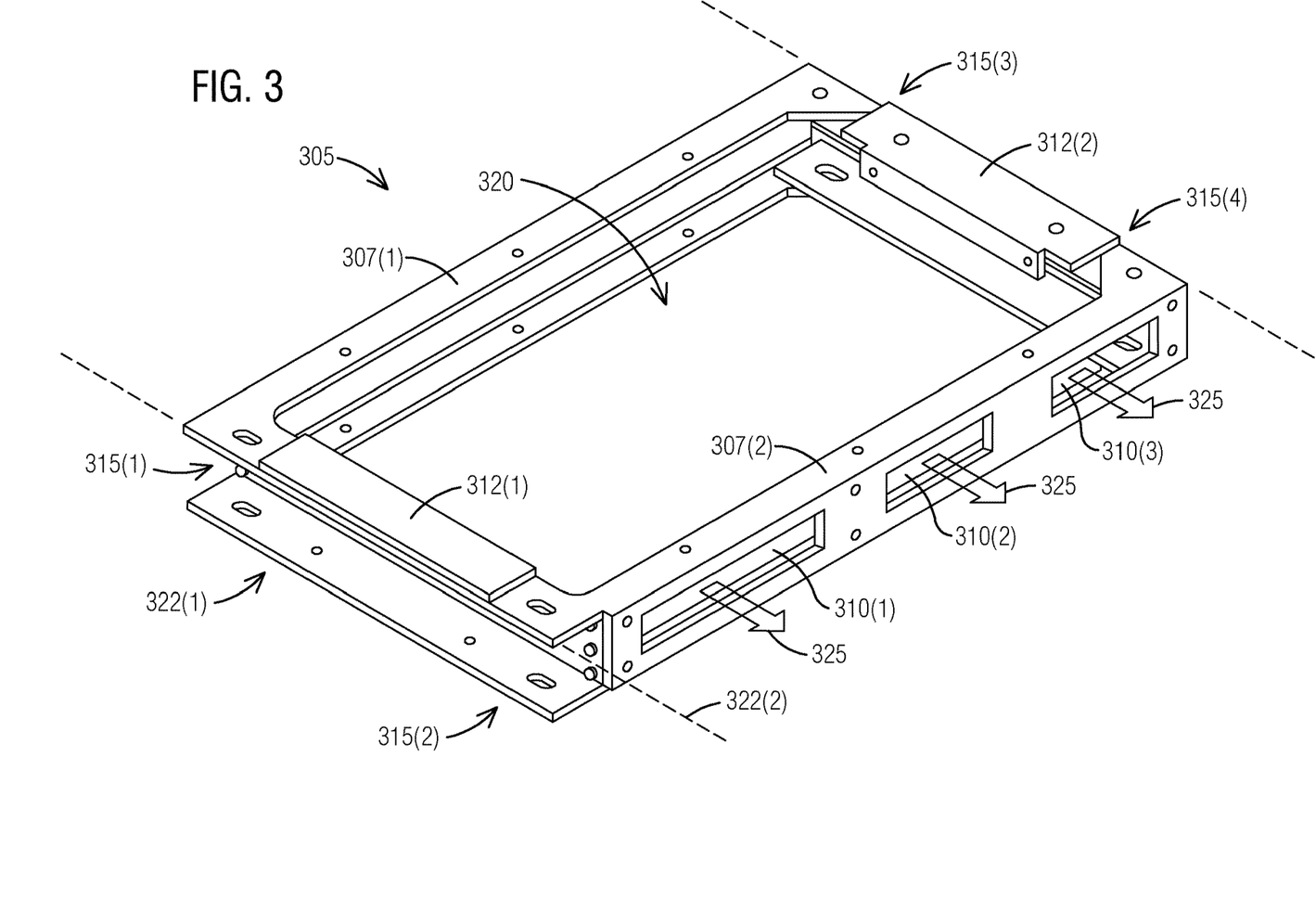
FIG. 3 illustrates an isometric view of a left end section riser base in accordance with an exemplary embodiment of the present invention.

Turning now to FIG. 3, it illustrates an isometric view of a left end section riser base 305 in accordance with an exemplary embodiment of the present invention. The left end section riser base 305 includes a first side plate or channel 307(1) with no openings and a second side plate or channel 307(2) with first openings 310(1-3) that define an internal arc pathway 325. The left end section riser base 305 includes a front wall 312(1) having a first end 315(1) and a second end 315(2), a rear wall 312(2) having a first end 315(3) and a second end 315(4), the first side plate or channel 307(1) connecting the first end 315(1) of the front wall 312(1) to the first end 315(3) of the rear wall 312(2), the second side plate or channel 307(2) connecting the second end 315(2) of the front wall 312(1) to the second end 315(4) of the rear wall 312(2), and forming the left end section riser base 305 having a central open area 320 in a first section 322(1) of a switchgear that is adjacent a second section 322(2) of the switchgear. The switchgear typically sits on a solid floor.

At least one opening of the first openings 310(1-3) in the second side plate or channel 307(2) to provide a passage to an arc from the first section 322(1) of the switchgear to the second section 322(2) of the switchgear, and thereby forming the left end section riser base 305 with the internal arc pathway 325. At least one opening of the first openings 310(1-3) in the second side plate or channel 307(2) channels the arc and arc plasma away from a front compartment of the switchgear to at least one adjacent section. The internal arc pathway 325 vents the arc from a front compartment of the switchgear to at least one adjacent section by routing the arc under the switchgear such that arc gases then flow upwards through a rear compartment of the switchgear where the arc gasses are safely discharged to an outside air.

Figure 4:
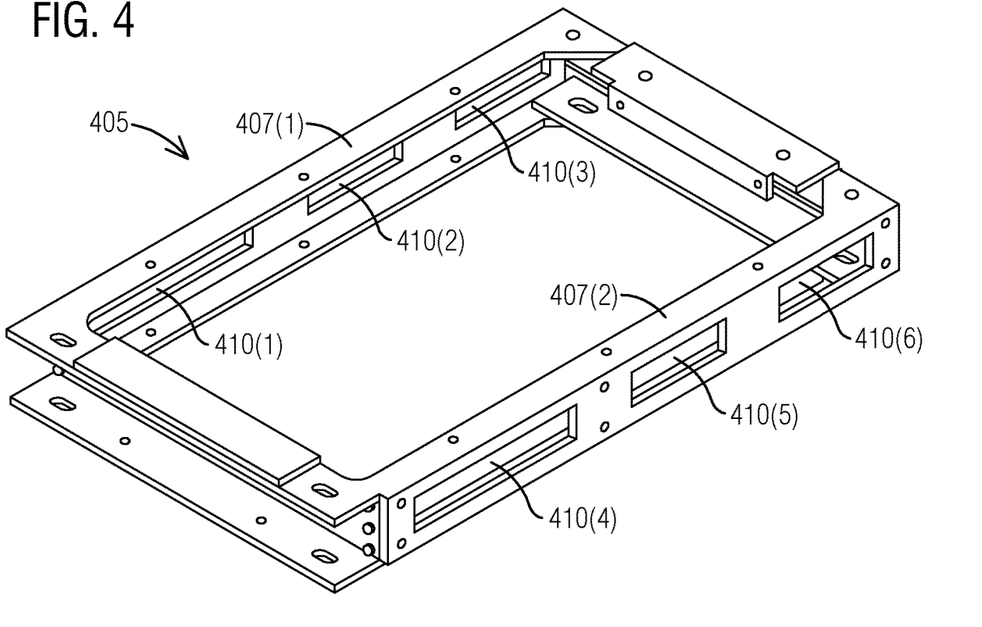
FIG. 4 illustrates an isometric view of a mid-section riser base in accordance with an exemplary embodiment of the present invention.

FIG. 4 illustrates an isometric view of a mid-section riser base 405 in accordance with an exemplary embodiment of the present invention. The mid-section riser base 405 includes a first side plate 407(1) with second openings 410(1-3) and a second side plate 407(2) with third openings 410(4-6).

Figure 5:
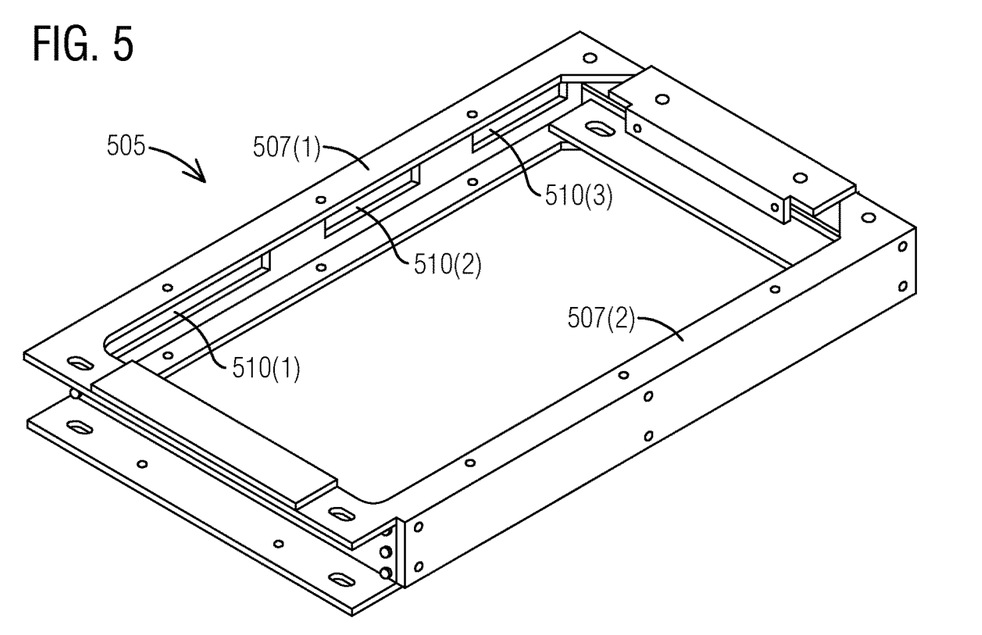
FIG. 5 illustrates an isometric view of a right end section riser base in accordance with an exemplary embodiment of the present invention.

As seen in FIG. 5, it illustrates an isometric view of a right end section riser base 505 in accordance with an exemplary embodiment of the present invention. The right end section riser base 505 includes a first side plate 507(1) with fourth openings 510(1-3) and a second side plate 507(2) with no openings.

Figure 6:
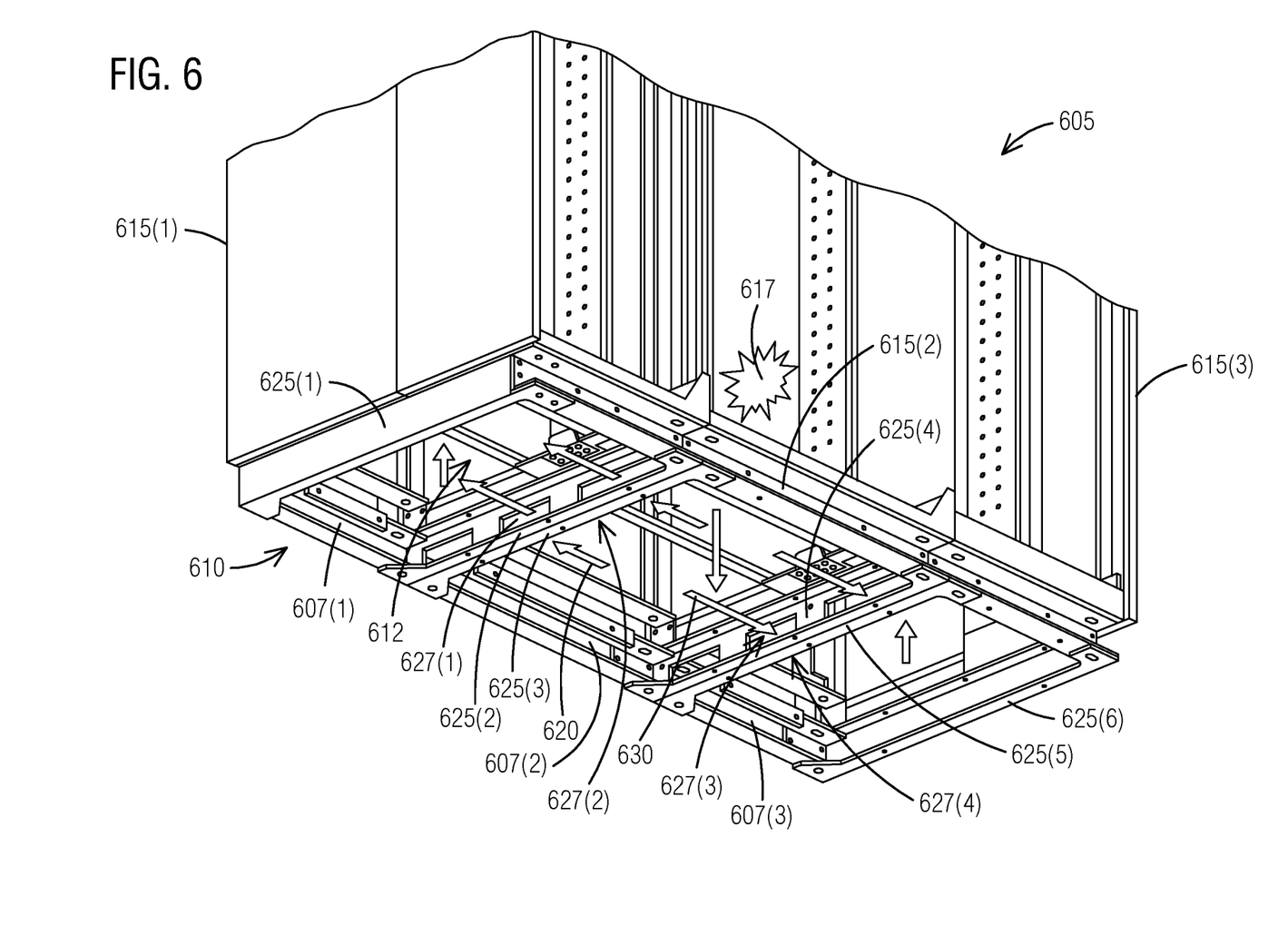
FIG. 6 illustrates a bottom isometric view of a front connected switchgear in accordance with an exemplary embodiment of the present invention.

As shown in FIG. 6, it illustrates a bottom isometric view of a front connected switchgear 605 in accordance with an exemplary embodiment of the present invention. The front connected switchgear 605 is positioned over a mounting base 607(1). The front connected switchgear 605 has at least one opening in a base 610 of the front connected switchgear 605. At least a portion of the opening in the base 610 overlaps with at least a portion of a central open area 612 of the mounting base 607(1). Other two mounting bases are shown as 607(2-3) under the front connected switchgear 605.

The front connected switchgear 605 comprises three sections: a left end section 615(1), a mid-section 615(2) and a right end section 615(3). In the event of an arc fault 617 in a front portion of the mid-section 615(2) which can be an arc event in a breaker compartment which may be located in a lower portion of the mid-section 615(2). The mid-section 615(2) can also be a cable section where the arc fault 617 event can occur on the load side cable connections or line side cable connections. In any scenario, gases/plasma 620 (shown as arrows) can flow downwards and into adjacent section and flow towards the rear top of the sections where they are safely discharged to the outside air from a ventilation structure (not seen). The arc/plasma 620 can also flow towards the rear of the mid-section 615(2) and towards the top where it can exhaust from the ventilation structure. An internal arc pathway is created to safely divert all the plasma from the front of the front connected switchgear 605 towards the rear and top of the front connected switchgear 605.

The front connected switchgear 605 comprises with an internal arc pathway comprises a first section, i.e., the mid-section 615(2) and a second section, i.e., the right end section 615(3). The second section 615(3) is disposed adjacent to the first section 615(2). The front connected switchgear 605 further comprises a left end section riser base 607(1), a mid-section riser base 607(2) and a right end section riser base 607(3) (the three mounting bases shown as 607(1-3)). The front connected switchgear 605 is positioned over the left end section riser base 607(1), the mid-section riser base 607(2) and the right end section riser base 615(3).

The left end section riser base 607(1) includes a first side plate 625(1) with no openings and a second side plate 625(2) with a first opening 627(1). The mid-section riser base 607(2) includes a first side plate 625(3) with a second opening 627(2) and a second side plate 625(4) with a third opening 627(3). The right end section riser base 607(3) includes a first side plate 625(5) with a fourth opening 627(4) and a second side plate 625(6) with no openings. At least one opening of the first opening 627(1), the second opening 627(2), the third opening 627(3), the fourth opening 627(4) provides the passage to an arc from the first section 615(2) of the front connected switchgear 605 to the second section 615(3) of the front connected switchgear 605, and thereby forming an internal arc pathway 630.

Figure 7:
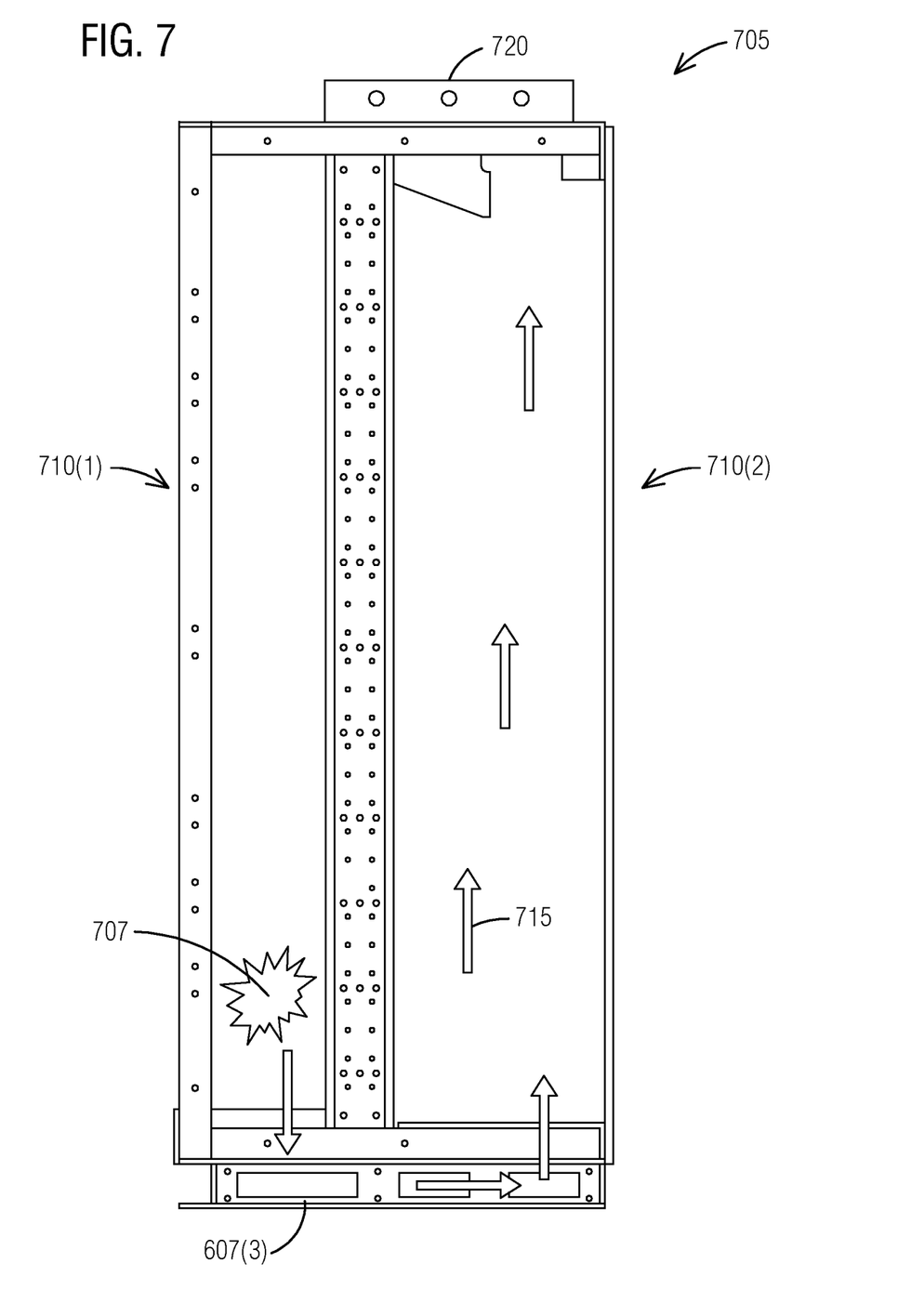
FIG. 7 illustrates a right-side view of a front connected switchgear in accordance with an exemplary embodiment of the present invention.

In FIG. 7, it illustrates a right-side view of a front connected switchgear 705 in accordance with an exemplary embodiment of the present invention. FIG. 7 shows an arc fault event 707 occurring in a front 710(1) of the front connected switchgear 705. Gases/plasma 715 (shown as arrows) can flow in an adjacent section, towards a rear 710(2) of the front connected switchgear 705 and towards the top where they are safely discharged to the outside air through a ventilation structure 720.

Figure 8:
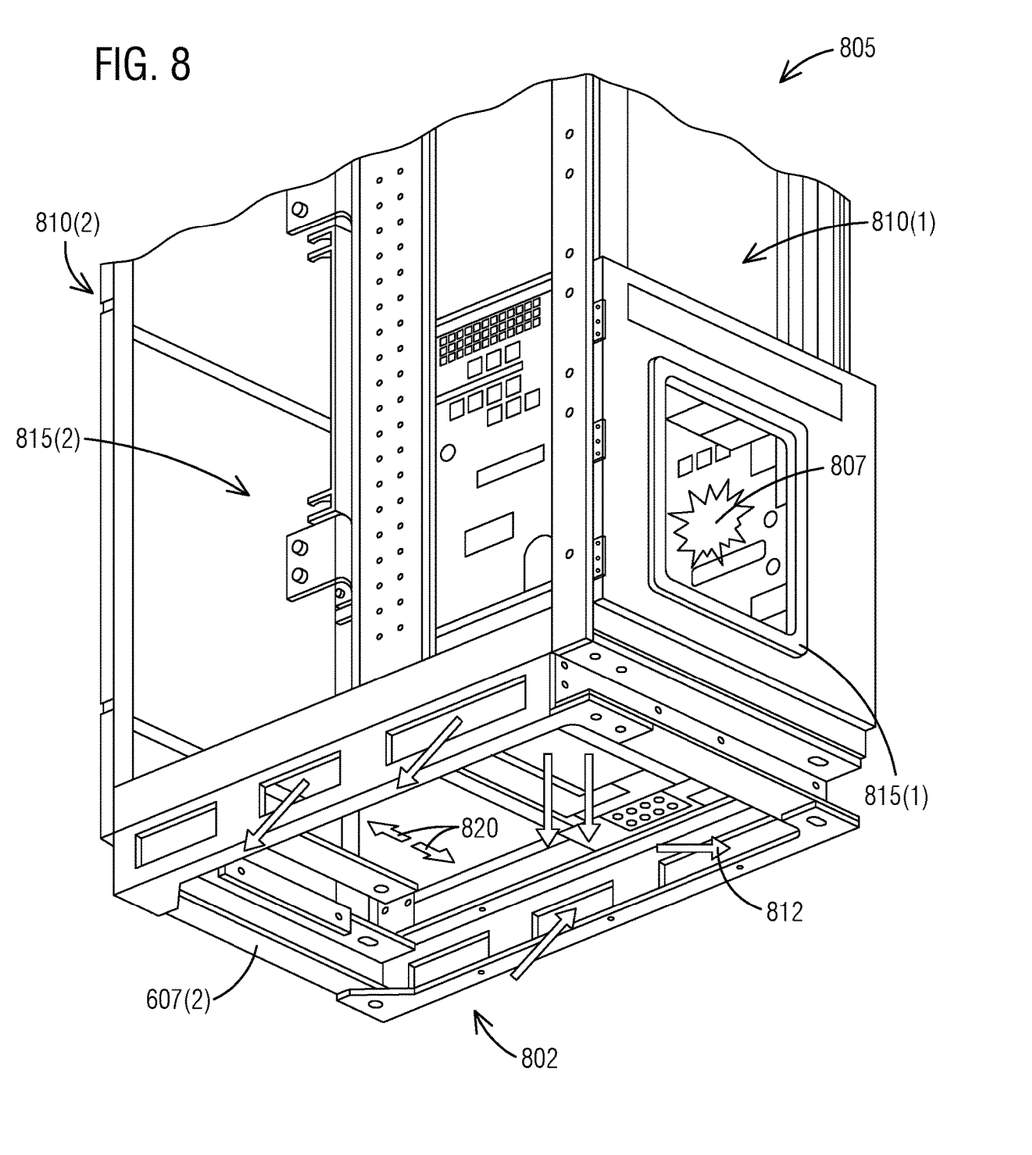
FIG. 8 illustrates a bottom isometric view of a mid-section of a front connected switchgear in accordance with an exemplary embodiment of the present invention.

With regard to FIG. 8, it illustrates a bottom isometric view of a mid-section 802 of a front connected switchgear 805 in accordance with an exemplary embodiment of the present invention. In the mid-section 802, an arc fault event 807 occurs in a front 810(1) of the front connected switchgear 805. Gases/plasma 812 (shown as arrows) can flow in an adjacent section, and then towards a rear 810(2) of the front connected switchgear 805 and towards the top where they are safely discharged to the outside air through a ventilation structure.

The front connected switchgear 805 comprises a front compartment 815(1) such that an internal arc pathway 820 channels the arc and arc plasma away from the front compartment 815(1) of the front connected switchgear 805 to at least one adjacent section (not seen). The front connected switchgear 805 further comprises a rear compartment 815(2) such that the internal arc pathway 820 vents the arc from the front compartment 815(1) of the front connected switchgear 805 to at least one adjacent section by routing the arc under the front connected switchgear 805 such that arc gases then flow upwards through the rear compartment 815(2) of the front connected switchgear 805 where the arc gasses are safely discharged to an outside air.

While a front connected switchgear is described here a range of one or more other switchgears or other forms of switchgears are also contemplated by the present invention. For example, other types of switchgears may be implemented based on one or more features presented above without deviating from the spirit of the present invention.

The techniques described herein can be particularly useful for low voltage switchgears and switchboards. While particular embodiments are described in terms of a low voltage switchgear, the techniques described herein are not limited to such a structure but can also be used with other switchgears and switchboards.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A switchgear with an internal arc pathway, comprising:
   a first section;
   a second section adjacent to the first section;
   a left end section riser base including a first side plate with no openings and a second side plate with a first opening;
   a mid-section riser base including a first side plate with a second opening and a second side plate with a third opening; and
   a right end section riser base including a first side plate with a fourth opening and a second side plate with no openings,
   wherein at least one opening of the first opening, the second opening, the third opening, the fourth opening provides the passage to an arc from the first section of the switchgear to the second section of the switchgear, and thereby forming the internal arc pathway.

2. The switchgear of claim 1, wherein the switchgear is positioned over the left end section riser base, the mid-section riser base and the right end section riser base.

3. The switchgear of claim 1, further comprising:
   at least one set of ventilation holes to channel the passage of the arc.

4. The switchgear of claim 1, further comprising:
   at least one equipment compartment.

5. The switchgear of claim 1, further comprising:
   at least one equipment compartment, wherein the at least one equipment compartment accommodates at least one equipment selected from a group consisting of a circuit breaker, an electronic device, and an electronic module.

6. The switchgear of claim 1, further comprising:
   at least one vent stack for the passage of an arc plasma.

7. The switchgear of claim 6, further comprising:
an upper surface, wherein the at least one vent stack is located on the upper surface of the switchgear.

8. The switchgear of claim 6, wherein the at least one vent stack is secured to the switchgear via at least one securing means.

9. The switchgear of claim 1, further comprising:
a front compartment, wherein the internal arc pathway channels the arc and arc plasma away from the front compartment of the switchgear.

10. The switchgear of claim 1, further comprising:
a front compartment; and
a rear compartment, wherein the internal arc pathway vents the arc from the front compartment of the switchgear by routing the arc under the switchgear such that arc gases then flow upwards through the rear compartment of the switchgear where the arc gasses are safely discharged to an outside air.

11. A method of providing a switchgear with an internal arc pathway, the method comprising:
providing a first section;
providing a second section adjacent to the first section;
providing a left end section riser base including a first side plate with no openings and a second side plate with a first opening;
providing a mid-section riser base including a first side plate with a second opening and a second side plate with a third opening; and
providing a right end section riser base including a first side plate with a fourth opening and a second side plate with no openings,
wherein at least one opening of the first opening, the second opening, the third opening, the fourth opening provides the passage to an arc from the first section of the switchgear to the second section of the switchgear, and thereby forming the internal arc pathway.

12. The method of claim 11, wherein the switchgear is positioned over the left end section riser base, the mid-section riser base and the right end section riser base.

13. The method of claim 11, wherein the switchgear further comprising:
at least one set of ventilation holes to channel the passage of the arc.

14. The method of claim 11, wherein the switchgear further comprising:
at least one equipment compartment.

15. The method of claim 11, wherein the switchgear further comprising:
at least one equipment compartment, wherein the at least one equipment compartment accommodates at least one equipment selected from a group consisting of a circuit breaker, an electronic device, and an electronic module.

16. The method of claim 11, wherein the switchgear further comprising:
at least one vent stack for the passage of an arc plasma.

17. The method of claim 16, wherein the switchgear further comprising:
an upper surface, wherein the at least one vent stack is located on the upper surface of the switchgear.

18. The method of claim 16, wherein the at least one vent stack is secured to the switchgear via at least one securing means.

19. The method of claim 11, wherein the switchgear further comprising:
a front compartment, wherein the internal arc pathway channels the arc and arc plasma away from the front compartment of the switchgear.

20. The method of claim 11, wherein the switchgear further comprising:
a front compartment; and
a rear compartment, wherein the internal arc pathway vents the arc from the front compartment of the switchgear by routing the arc under the switchgear such that arc gases then flow upwards through the rear compartment of the switchgear where the arc gasses are safely discharged to an outside air.

* * * * *